(12) United States Patent
Jalkanen et al.

(10) Patent No.: US 7,545,271 B2
(45) Date of Patent: Jun. 9, 2009

(54) RFID AUTHORIZATION OF CONTENT TO AN ELECTRONIC DEVICE

(75) Inventors: Janne Jalkanen, Helsinki (FI); Ilkka Känsälä, Oulu (FI)

(73) Assignee: Nokia Corporation, Espoo (FI)

( * ) Notice: Subject to any disclaimer, the term of this patent is extended or adjusted under 35 U.S.C. 154(b) by 101 days.

(21) Appl. No.: 11/174,101

(22) Filed: Jun. 30, 2005

(65) Prior Publication Data
US 2007/0001852 A1  Jan. 4, 2007

(51) Int. Cl.
*G08B 13/14* (2006.01)
(52) U.S. Cl. .................. 340/572.1; 340/5.82; 709/229; 713/185
(58) Field of Classification Search ... 340/572.1–572.9, 340/5.82, 5.61, 10.3, 10.1; 726/3; 445/41.2; 709/229; 713/185, 172, 201
See application file for complete search history.

(56) References Cited

U.S. PATENT DOCUMENTS

| 6,281,784 | B1 * | 8/2001 | Redgate et al. ......... 340/310.11 |
| 6,351,813 | B1 * | 2/2002 | Mooney et al. ............. 713/185 |
| 6,618,807 | B1 * | 9/2003 | Wang et al. ................. 713/189 |
| 6,717,507 | B1 * | 4/2004 | Bayley et al. ................. 340/5.1 |
| 7,123,165 | B2 * | 10/2006 | Davenport et al. .......... 340/931 |
| 2002/0087894 | A1 * | 7/2002 | Foley et al. .................. 713/202 |
| 2003/0028653 | A1 * | 2/2003 | New et al. .................... 709/229 |
| 2003/0030542 | A1 * | 2/2003 | von Hoffmann ........... 340/5.61 |
| 2003/0191946 | A1 * | 10/2003 | Auer et al. ................... 713/182 |
| 2004/0087273 | A1 * | 5/2004 | Perttila et al. .............. 455/41.2 |
| 2004/0257202 | A1 * | 12/2004 | Coughlin et al. ........... 340/5.82 |
| 2005/0001712 | A1 * | 1/2005 | Yarbrough .................. 340/5.82 |
| 2005/0035882 | A1 * | 2/2005 | Vassallo ...................... 340/988 |
| 2005/0086355 | A1 * | 4/2005 | Deshpande ................. 709/231 |
| 2005/0225427 | A1 * | 10/2005 | Bell et al. ..................... 340/5.2 |
| 2005/0231328 | A1 * | 10/2005 | Castle et al. ................ 340/10.3 |
| 2005/0278776 | A1 * | 12/2005 | Kitagawa et al. ............... 726/3 |
| 2006/0197676 | A1 * | 9/2006 | Smith ..................... 340/825.69 |

FOREIGN PATENT DOCUMENTS

| WO | WO 2004/003829 A1 | 1/2004 |
| WO | WO 2004/040923 | 5/2004 |

OTHER PUBLICATIONS

O'Connor, M.C., "Group Studies RFID to Stop Digital Piracy", May 12, 2005, RFID Journal, 3 pgs.
Dean, K., "Give Your DVD Player the Finger", May 19, 2005, Wired News, 3 pgs.

\* cited by examiner

*Primary Examiner*—Davetta W Goins
*Assistant Examiner*—Hoi C Lau
(74) *Attorney, Agent, or Firm*—Harrington & Smith, PC

(57) ABSTRACT

Pre-stored or bundled content such as programs can be enabled by using an RFID tag with suitable authorization information according to a process, in which the informs a host device of contents that can be activated with the RFID tag, the host device obtains respective authorization information from the RFID tag and subsequently refreshes the authorization in order to extend the activation over a desired period of time. Unless refreshed, the authorization is terminated after a given interval as of the authorization so that the substantial use of the content is subjected to the possession of the RFID tag and a license can be sold or transferred together with the RFID tag.

22 Claims, 4 Drawing Sheets

RFID AUTHORIZATION OF CONTENT TO AN ELECTRONIC DEVICE

FIELD OF THE INVENTION

This invention relates to wireless rights management. It relates particularly, but not exclusively, to establishing right to use information with an RFID module.

BACKGROUND OF THE INVENTION

Modem electronic devices are converging towards computers in that often their features, applications and services can be upgraded by downloading software or by enabling pre-stored software.

Enabling the use of content has inspired numerous technologies as understandably many content providers wish to inhibit unauthorized use of their material. Some content providers have opted to trust the end users and released shareware applications with the idea that time or usage type limited using of the content is free of charge and for other use, the end users should send checks or credit card payment data. Perhaps more often, some features, such as document saving or printing are disabled or restrained, until an access key is typed in to prove the purchase of the program.

Unlike shareware distributors who solely rely on the honesty of the end user, some content providers impose copy protection and send individual access keys after receiving a payment for the content. Some sophisticated systems even individualize the content or key to depend upon original target environment so that the same key would not work for another copy of the same software in another electronic device. This may be done by taking some equipment specific code into account when creating the key and then again when verifying the key on installation and use phase. For instance, Microsoft® has adopted product activation approach in which the end user should enter an individual product label to register and responsively receive a release code to enable extended use of the product in question. If during the activation of the product, the number of licensed computers is exceeded, no new activation succeeds and consequentially the product may stop operating after a given period of time.

Typically, however, the end user has to type some code into the target equipment in order to enable the use of desired content therein.

According to Internet publication *Wired News*, May 19, 2005 article by Katie Dean, Professor Rajit Gadh is developing technology to tag Digital Versatile Data (DVD) discs carrying movies with Radio Frequency Identification units or RFID tags to authorize the discs to compatible DVD players configured to present the content of the DVD disc only after verifying the RFID tag. The tag would be used to bind the use right to the person originally purchasing the DVD disc. At the store, someone buying a new DVD would have to provide a password or some kind of biometric data, like a fingerprint or iris scan, which would be added to the DVD's RFID tag. Then, when the DVD was popped into a specially equipped DVD player, the viewer would be required to re-enter his or her password or fingerprint. The system would require consumers to buy new DVD players with RFID readers. Another interview of Professor Gadh was published by Mary Catherine O'Connor in the Internet publication *RFID Journal* on May 12, 2005.

The system of Professor Gadh appears very promising for strict restriction of usage right, but would apparently require dealers to purchase special equipment for obtaining and storing the user's own password or biometric data onto the RFID tag. Using biometric data as a key could however be seen as too restrictive as then even other members of the family would not have access to the content in the absence of the original purchaser. This might be inconvenient in case of content for children, for instance, as then a parent who purchased the content would not always be present when the access would be desired. Also buying DVD discs locked with a biometric key for a surprise gift could become impossible. The Article in the Wired News also expressed some reservations to the system. For instance, computer science professor Ed Felten of Princeton University suspected that "the people would find it creepy to give their fingerprints every time they wanted to play a DVD" and concerned it unlikely that people would buy new DVD players with RFID readers in order to purchase DVDs that are less functional. Hence, the incorporation of RFID to DVD players for content protection purpose does not appear desirable.

It is also known from the applicant's earlier patent application publication WO2004/003829A1 to use an RFID tag to authorize the use of downloaded music in a mobile telephone. Another patent application publication of the applicant, WO2004/040923A1 discloses an arrangement using which downloaded applications can be activated using an RFID tag with suitable information stored therein.

Despite the known advances in content authorization and use of RFID, further solutions for providing and authorizing access to content are needed to facilitate legally authorized installation or taking into use of applications and services.

SUMMARY OF THE INVENTION

It is an objective of the invention to avoid or at least mitigate the problems found in prior art.

According to a first aspect of the invention, an electronic device is provided, comprising:

a memory for storing content the access to which is specifically restricted, whereby access to the content is allowed by presenting an access code;

a Radio Frequency IDentification (RFID) communications module capable of detecting an RFID unit brought into the proximity of the device and of receiving information from the RFID unit; and a processor for verifying whether the information received from the RFID unit contains the access code and configured to allow execution of the content, wherein the RFID communications module and the processor are configured to repeatedly detect the presence of the RFID unit and to verify whether the information received from the RFID unit contains the access code.

Advantageously, services, functions and applications may be pre-stored into the electronic device and subsequently taken into use after RFID based authorization. Further advantageously, the content may be pre-stored either or both in the electronic device and in an insertable memory medium. Such pre-stored content may be sold to an end-user by selling an RFID unit equipped with means for providing the access code to the electronic device.

The repeated verifying of the access code may take place at a fixed or at least partly random time or interval. By re-verifying the access code, the access right may be granted with an RFID so that unauthorized temporary access to the RFID unit will not grant any long-term or irreversible authorization. Conversely, the RFID unit may be on offer in a sales point without fear that the RFID is already exhausted or inoperable for the purchaser.

The electronic device may comprise an RFID unit holder to facilitate the holding of the RFID unit in the proximity of the RFID communication module.

Alternatively or additionally to being configured to grant a limited term authorization, the RFID unit may be configured to maintain authorization grant state based on which any new authorization is decided. The RFID unit may be configured capable of authorizing a pre-determined amount of electronic devices within a given period of time such as one per day.

Advantageously, the re-verifying the access code may prevent extended use of the restricted content so that the reliable use normally requires the possession of the RFID unit. Further advantageously, connecting the use authorization to the possession of the RFID unit enables transfer of a use license to a third party by reselling the RFID unit without multiplying the use right for an excessive period of time. Even further, the repeated checking of the access code allows offering the RFID units in a normal shop so that it is of little harm even if a user would, despite possible orders to the contrary, bring her own electronic device to the proximity of the RFID unit.

The processor may be configured to allow testing the content for a predetermined or random period of time or number of sessions before requiring the access code for further use. This enables the testing of a function, service or application provided by the program code first and purchasing the RFID unit with a suitable access code only after initial user satisfaction. It also helps reselling the RFID unit, as a potential buyer may briefly test the object of merchandise first.

The content may comprise generally software or computer program code executable by the processor or by one or more other components of the electronic device. The content may generally be capable of controlling the operation of the electronic device. Hence, pre-programmed features, that is, functions, services and/or applications can be enabled using the RFID unit.

The access to the content may be individually and content specifically restricted. Advantageously, the content conversely may have an individual access, independent of user account credentials, for example. The access to the content may be bound to a predetermined period of time. The period may correspond to a subscription of a service such as video, news or magazine delivery.

The electronic device may receive the content by streaming, that is, so that part of the content is reproduced before whole of the content is received. This advantageously provides perceivably fast responding.

The RFID communication module may wirelessly power the RFID module. This is very convenient since it is very simple to place the RFID unit close to the electronic device for the period of desired use of the content.

According to a second aspect of the invention, there is provided a method for controlling access to content by an electronic device, comprising:

storing content the access to which is restricted specifically to the content in question, whereby access to the content is allowed by presenting an access code;

detecting an RFID unit brought into the proximity of the device and of receiving information from the RFID unit;

verifying whether the information received from the RFID unit contains the access code to allow execution of the content; and repeatedly detecting the presence of the RFID unit and verifying whether the information received from the RFID unit contains the access code.

According to a third aspect of the invention, there is provided a computer program for controlling access to content by an electronic device, comprising:

computer executable program code for causing the electronic device to store content the access to which is specifically restricted, whereby access to the content is allowed by presenting an access code;

computer executable program code for causing the electronic device to detect an RFID unit brought into the proximity of the device and of receiving information from the RFID unit;

computer executable program code for causing the electronic device to verify whether the information received from the RFID unit contains the access code to allow execution of the content; and computer executable program code for causing the electronic device to repeatedly detect the presence of the RFID unit and to verify whether the information received from the RFID unit contains the access code.

According to a fourth aspect of the invention, there is provided an authorization unit for wirelessly authorizing access to content by an electronic device, comprising:

a communication block for exchanging wirelessly information with an electronic device;

a persistent memory for maintaining authorization information for authorizing use of content; and a processor configured to verify a present licensing status related to the content, to determine whether the authorization should be permitted, and if yes, to provide authorization information using the communication block to the electronic device to grant a license to use the content.

Various embodiments of the present invention have been illustrated only with reference to the one aspect of the invention for sake of briefness, but it should be appreciated that corresponding embodiments may apply to other aspects as well.

BRIEF DESCRIPTION OF THE DRAWINGS

The invention will now be described, by way of example only, with reference to the accompanying drawings, in which.

DETAILED DESCRIPTION

Figure 1:
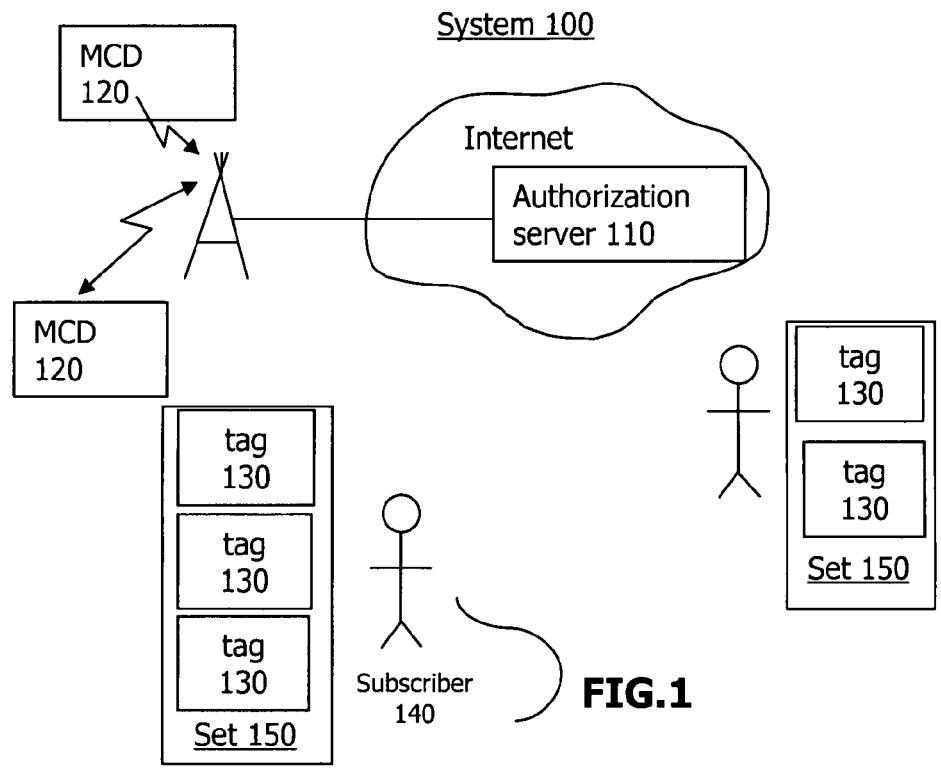
FIG. 1 shows a block diagram of a system according to an embodiment of the invention.

FIG. 1 shows a block diagram of a system 100 according to an embodiment of the invention. The system 100 comprises an authorization server 110, a plurality of Mobile Communication Devices (MCD) 120, a number of RFID tags 130, a plurality of subscribers 140 and groups of RFID tags (tags in short) 130 illustrating sets 150 representing various tags 130 associated with a given MCD 120 or subscriber 140.

The system assigns and controls use rights or authorization for given applications, services and/or functions (referred to as executable content in general) as will be described with further detail with reference to the further drawings intended to facilitate the understanding of various forms and examples of the present invention.

Figure 2:
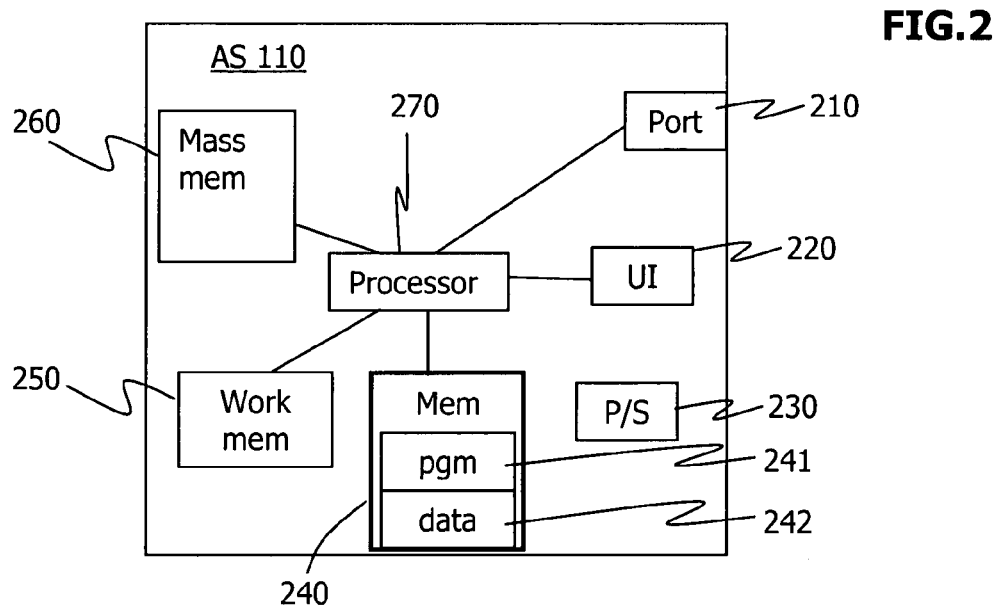
FIG. 2 shows a block diagram of an authorization server of FIG. 1.

FIG. 2 shows a block diagram of an Authorization Server (AS) 110 of FIG. 1. The AS 110 contains a data port 210 in order to output to the MCD 120 and to optionally input data from the MCD 120, a user interface 220 for data exchange (input and output) with an administrator, a power supply 230 for powering the MCD 120, a persistent or non-volatile memory 240 for storing computer program code 241 and long-term data 242, a work memory 250 for buffering data for fast processing, a mass memory 260 typically for storing substantial amounts of data and a processor 270 for executing the stored computer program code and for thereby generally controlling the operation of the other parts of the MCD 120. The data port 210 is typically capable of connecting to a computer data network such as the Internet or to a backbone system of a public land mobile network or a satellite radio network.

Figure 3:
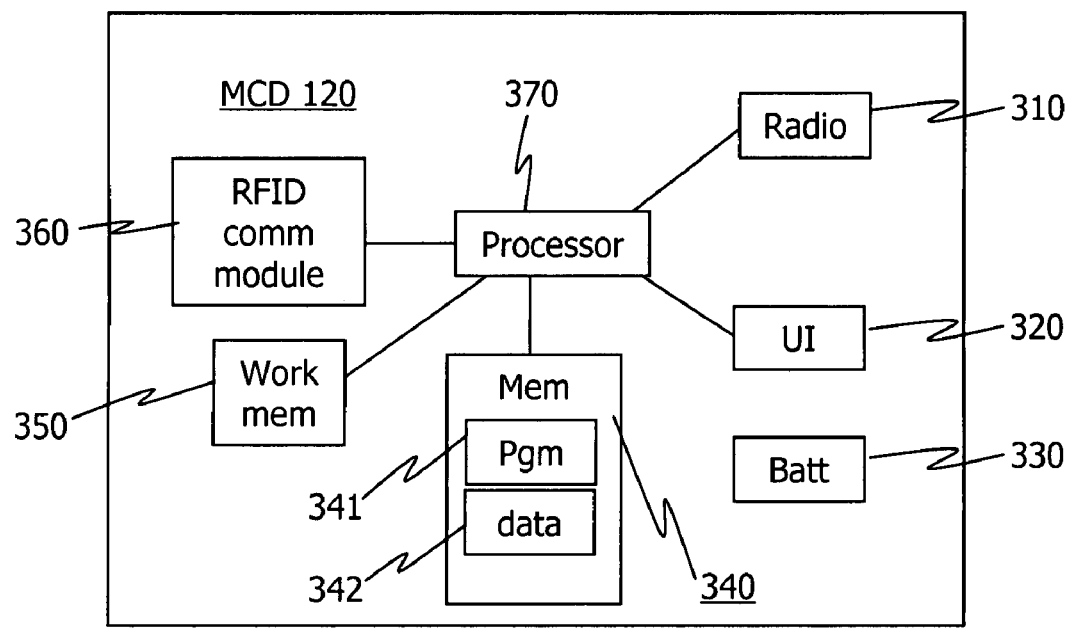
FIG. 3 shows a block diagram of a mobile communications device of FIG. 1.

FIG. 3 shows a block diagram of the Mobile Communications Device (MCD) 120 of FIG. 1. The MCD 120 contains a radio block 310 for wireless communications, a user interface 320 for data exchange (input and output) with a user, a battery 330 for powering the MCD 120, a persistent or non-volatile memory 340 for storing computer program code 341 and long-term data 342, a work memory 350 for buffering data for fast processing, an RFID tag reader (and optionally also writer) or generally an RFID communication module 360 and a processor 370 for executing the stored computer program code and for thereby generally controlling the operation of the other parts of the MCD 120. The radio block 310 is typically a cellular radio network compatible unit capable of receiving and/or transmitting computer program code over a cellular network. The MCD 120 may also contain a holder for carrying one or more RFID tags 130 at hand for subsequent use on refreshing an authorization.

Figure 4:
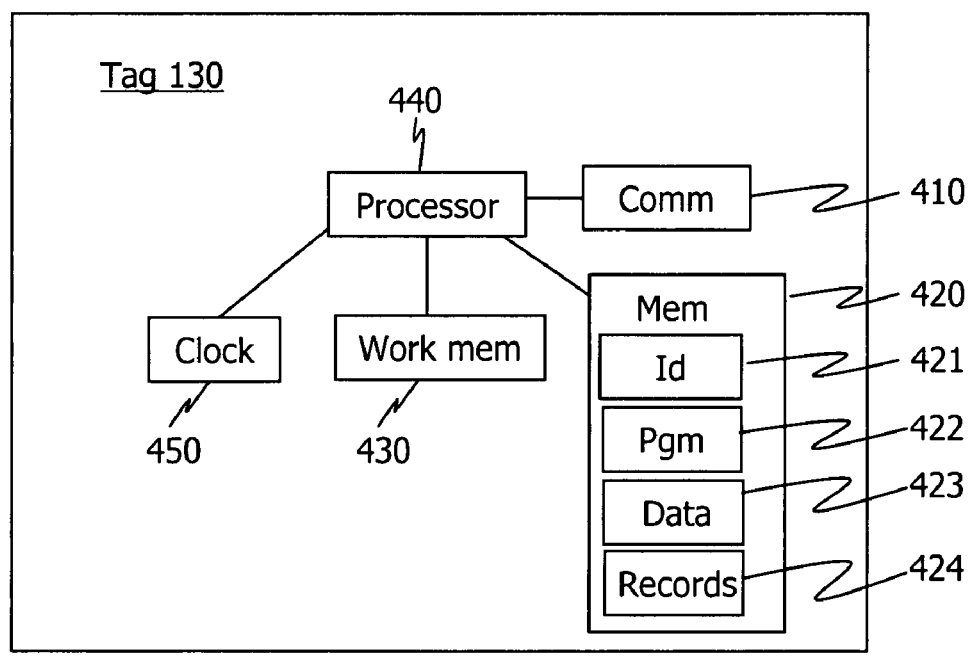
FIG. 4 shows a block diagram of an RFID tag according to FIG. 1.

FIG. 4 shows a block diagram of an RFID tag (tag 130) according to FIG. 1. The tag 130 contains a proximity communications block 410 for receiving signals and responsively transmitting response signals, a persistent memory 420 for storing identification information 421, and operating instructions 422 (that is, computer program code) and optionally user data 423, a work memory 430 and a processor 440 for running the computer program code and thereby controlling the operation of the tag 130. The tag 130 may additionally contain a battery for maintaining data in an otherwise volatile memory and/or for powering the tag 130 in order to provide longer operation distance form the RFID communication module 360. The persistent memory 420 further contains one or more authorization records 424 each containing authorization information for authorizing content by the MCD 120. It is also advantageous for particular embodiments for the tag 130 to contain a clock 450 (or timer). The identification information may contain a shared secret that is sent or compared with a response or that is used as a basis to compute derived information for concealing the actual shared secret from the communications between the tag 130 and the RFID communication module 360 of the MCD 120. In other words, the shared secret may provide static or dynamic authentication information, wherein static information may be reused later, whilst dynamic authentication information is typically adapted according to allowable interval of time and/or equipment. In either case, it can be said that the RFID provides authentication information or an access code based on the shared secret even if the code may vary from one time to another. In sake of simplicity, both static and dynamic access codes are treated equally in this application and the term access code should be understood to embrace also variable codes.

Figure 5:
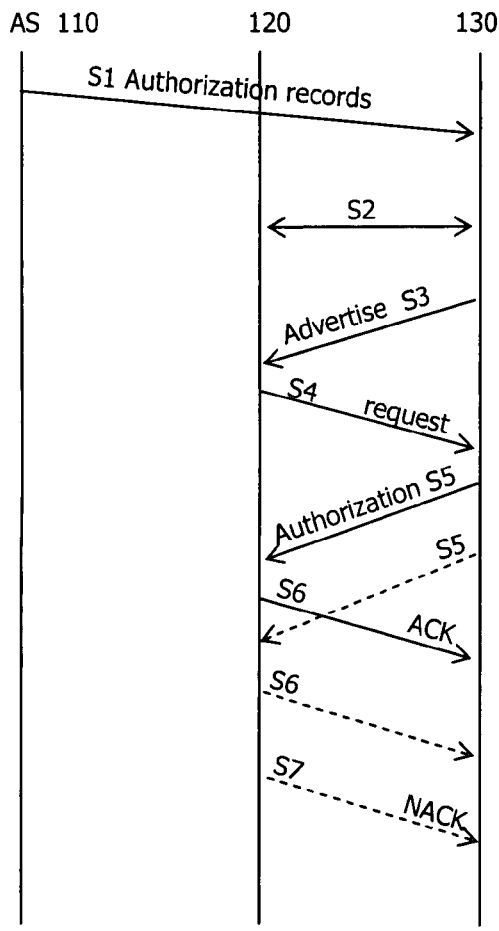
FIG. 5 shows a signaling diagram illustrating details of signaling in the system of FIG. 1.

FIG. 5 shows a signaling diagram illustrating details of signaling in the system of FIG. 1. The signaling presented is exemplary only and illustrates one possible way of using the invention. In signal (S) S1, the AS 110 sends the authorization records to the tag 130. This sending may take place by a mass transfer wherein the AS defines a function according to which the authorization records are generated by another server or equipment and stored in to the tag 130 among a batch of tags 130. After the tag 130 has been sold to a user or subscriber 140, the user may bring the tag 130 to the vicinity of the communication module 360 of the MCD 120. The communication module 360 and the tag 130 detect the presence of each other with signaling S2 and the tag 130 sends an advertisement signal S3 to the MCD 120 containing information on the designated content(s) for which the tag 130 is eligible. The MCD 120 sends, on demand, a request signal S4 to order the authorization for content. The request signal need not identify any particular content if only one is available, otherwise in the absence of an identifier of requested content, a predetermined one of the content may be chosen or the selection may be negotiated with separate signals not shown. After receiving the request signal S4, the tag 130 responds by a respective authorization signal S5 or a series of authorization signals S5 to authorize the use of one or more contents authorizable with the tag 130. In return, the MCD 120 acknowledges the signal S5 with acknowledgement S6 or sends a negative acknowledgement S7 in the absence of the authorization signal S5 within a predetermined period.

The authorization signal S5 may also contain a time condition for the period of allowed use time in terms of available time or expire moment for any given authorization. The authorization signal may further provide such a time condition separate for two or more authorized contents.

Furthermore, the MCD 120 and the tag 130 may exchange signaling in which the MCD 120 is requested to stop providing another content before providing use for another content on authorization of the tag 130. Such a signaling may include signals S6 from the tag 130 to the MCD 120 enquiring presently authorized other content, response signal S7 to the tag 130 listing presently authorized content and disablement signal S8 from the tag to the MCD 120 to command the MCD to disable respective content to be subsided by a new authorization.

Figure 6:
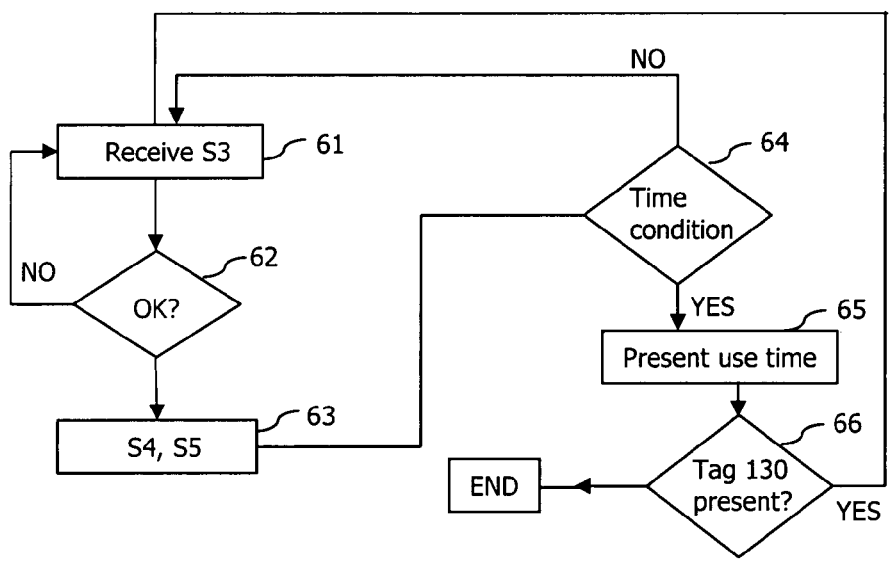
FIG. 6 shows a flow chart illustrating the operation of the mobile communications device of FIG. 1.

FIG. 6 shows a flow chart illustrating the operation of the mobile communications device MCD 120 of FIG. 1. In step 61, the MCD 120 receives the advertisement signal S3 informing of available authorization for a given content (say, a new screen saver monitoring stock ratings). Responsive to the advertisement signal, the MCD 120 prompts a user to select whether to activate the content offered. Particularly if the content is pre-stored by the MCD 120 supplier or manufacturer, the subscriber 140 may confidently allow the activation of the content and confirm the procedure. Otherwise, the process resumes to wait for step 61.

After the user has confirmed the activation or authorization of the use of the content prompted in step 61, the MCD 120 exchanges signals S4 and S5 in step 62. At step 64 it is checked if the authorization signal S5 contains a time condition. If yes, at step 65 the MCD 120 advantageously displays the authorized use time and starts a corresponding timer to count down remaining usage right. The MCD 120 can be configured to display or start displaying or otherwise presenting at step 65 the remaining use status by an icon or other display indicator in order to keep the subscriber 140 informed of the remaining time. On expiry of the authorized use time, the MCD 120 checks at step 66 whether the tag 130 is still available to refresh the authorization if the tag 130 is still eligible at that time to authorize the use of the content. If yes, the process resumes to step 61, otherwise the process ends until the tag 130 (or another tag 130) is brought into proximity of the MCD 120 and the process is restarted from step 61.

Figure 7:
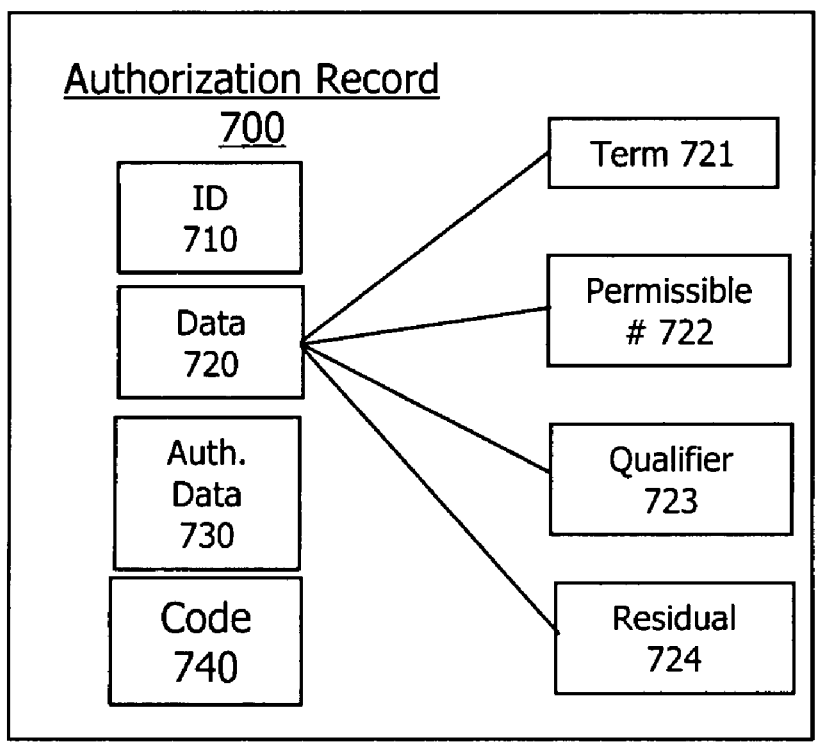
FIG. 7 shows an exemplary structure of an authorization record stored into the RFID tag of FIGS. 1 and 4.

FIG. 7 shows an exemplary structure of an authorization record 700 stored into the RFID tag 130 of FIGS. 1 and 4. The authorization record 700 contains a content identifier 710 for which the authorization record is intended, license conditions data 720, current authorization situation data 730 and an integrity protector code 740. The content identifier 710 designates the content or contents if many for which the tag 130 is eligible, that is, usable to authorize the use. The license conditions data 720 contains possible licensing restrictions such as the term 721 of licensing new subscribers, the permissible number 722 of possible simultaneously licensed subscribers, a qualifier 723 for each designated content or a common qualifier for more than one designated contents reflecting whether removal of authorization is required before authorizing a new subscriber prior the present authorization term of a preceding authorization expires, and a residual compensation flag 724 for determining whether a subscriber returning the tag 130 should be compensated for a remaining license term 721 or usable period of the tag 130.

The authorization record can be modified in a number of ways in accordance with present needs. For instance, a common tag may be capable of authorizing using any of the different content provided by a content provider with the condition that only one of these may be used at the time. Using the qualifier 723, the tag 130 may control that no second authorization is granted whilst another one may still be in force.

The present invention enables authorizing content whether pre-stored in an electronic device or delivered installed on a memory medium. It is also understood that the present invention in its different embodiments may provide numerous advantages, including but not restricted to transferring an end user license along the tag 130 to another user, to supplying users with terminals or memory cards with pre-installed applications or services which can be taken into use with a separately sold or bundled authorization tag 130 and using ordinary sales outlets such as grocery stores, record stores and kiosks to deliver the tags 130 to the users.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. A number of features were described as part of examples in the foregoing and wherever technically possible, the features should be regarded as optional and combinable with any different other examples of the description. For instance, the invention is useful also in various electronic devices, particularly in portable electronic books, PDA devices, gaming devices, music players, DRM enabled set-top boxes capable of providing limited access to (rented) content and GPS positioning devices. Hence, the scope of the invention is only restricted by the attached patent claims.

We claim:

1. A device, comprising:
    a memory configured to store content comprising preinstalled applications and services an access to at least one of which is specifically restricted;
    a radio frequency identification communications module configured to detect a radio frequency identification unit when in proximity of the device and to receive information from the radio frequency identification unit; and
    a processor configured to verify whether the information received from the radio frequency identification unit contains an access code and a content identifier, where the content identifier is configured to identify a content for which the access code is an authorization to use, the processor being further configured to license the use of the content corresponding to the content identifier based on the access code and thus authorize the use of the content corresponding to the content identifier when the access code is contained in the information received from the radio frequency identification unit, wherein authorizing is independent of user credentials and is transferable with the radio frequency identification unit, and wherein the radio frequency identification communications module and the processor are configured to repeatedly detect the presence of the radio frequency identification unit and to verify whether the information received from the radio frequency identification unit contains the access code.

2. The device according to claim 1, wherein the content is pre-stored into the device or provided on an insertable memory medium.

3. The device according to claim 1, wherein the identified content is capable of controlling the operation of the device.

4. The device according to claim 1, wherein the repeated verifying of the access code occurs at one of a fixed or variable interval.

5. The device according to claim 1, wherein the device comprises an radio frequency identification unit holder to facilitate holding of the radio frequency identification unit in the proximity of the radio frequency identification communication module.

6. The device according to claim 1, wherein the radio frequency identification unit is configured to maintain an authorization grant state based on which any new authorization is decided.

7. The device according to claim 1, wherein the processor is configured to allow testing the identified content, before requiring the access code for further use.

8. The device according to claim 1, wherein the identified content comprises computer program code executable by the processor or by one or more other components of the device.

9. The device according to claim 1, wherein the access to the identified content is specifically restricted to an individual device.

10. The device according to claim 1, wherein the radio frequency identification communication module is configured to wirelessly power the radio frequency identification unit.

11. A method, comprising:
    storing content comprising preinstalled applications and services in a device the access to at least one of which is specifically restricted;
    detecting a radio frequency identification unit when in proximity of the device and receiving information from the radio frequency identification unit;
    verifying whether the information received from the radio frequency identification unit contains an access code and a content identifier, where the content identifier is configured to identify a content for which the access code is an authorization to use, and licensing the use of a content corresponding to the content identifier based on the access code and thus authorizing the use of the content corresponding to the content identifier, wherein authorizing is independent of user credentials and is transferable with the radio frequency identification unit; and repeatedly detecting the presence of the radio frequency identification unit and verifying whether the information received from the radio frequency identification unit contains the access code.

12. A method according to claim 11, wherein the content is pre-stored into the device or provided on an insertable memory medium.

13. A method according to claim 11, wherein the identified content is capable of controlling the operation of the device.

14. A method according to claim 11, wherein the identified content comprises computer program code executable by the processor or by one or more other components of the device.

15. A method according to claim 11, further comprising allowing testing of the identified content, before requiring the access code for further use.

16. A computer program for controlling access to content by an electronic device, the computer program embodied on a memory and executable by a processor to perform operations, comprising:

storing content comprising pre-installed applications or services the access to at least one of which is specifically restricted;

detecting a radio frequency identification unit when in proximity of the device and receiving information from the radio frequency identification unit;

verifying whether the information received from the radio frequency identification unit contains an access code and a content identifier, where the content identifier is configured to identify a content for which the access code is an authorization to use, licensing the use of a content corresponding to the content identifier based on the access code and thus authorizing the use of the content corresponding to the content identifier, wherein authorizing is independent of user credentials and is transferable with the radio frequency identification unit; and repeatedly detecting the presence of the radio frequency identification unit and to verifying whether the information received from the radio frequency identification unit contains the access code.

17. A program according to claim 16, wherein the content is pre-stored into the electronic device or provided on an insertable memory medium.

18. A program according to claim 16, wherein the identified content is capable of controlling the operation of the electronic device.

19. An apparatus, comprising:

a communication block configured to exchange wirelessly authorizing information with an electronic device that contains content comprising pre-installed applications and services the access to at least one of which is specifically restricted;

a persistent memory configured to maintain authorization information comprising an access code and content identifier, where the content identifier is configured to identify a content for which the access code is an authorization to use, wherein authorizing is independent of user credentials and is transferable with the radio frequency identification unit; and a processor configured to verify a present licensing status related to the content identified by the content identifier, to determine whether authorization of the use of the content should be permitted, and if yes, to provide the access code using the communication block to the electronic device to grant a license to use the content identified by the content identifier.

20. An apparatus according to claim 19, wherein the identified content is capable of controlling the operation of the electronic device.

21. An apparatus, comprising:

means for storing content comprising preinstalled applications and services in a device the access to at least one of which is specifically restricted;

means for detecting a radio frequency identification unit when in proximity of the device and receiving information from the radio frequency identification unit;

means for verifying whether the information received from the radio frequency identification unit contains an access code and a content identifier, where the content identifier is configured to identify a content for which the access code is an authorization to use, and licensing the use of a content corresponding to the content identifier based on the access code and thus authorizing the use of the content corresponding to the content identifier, wherein authorizing is independent of user credentials and is transferable with the radio frequency identification unit; and means for repeatedly detecting the presence of the radio frequency identification unit and verifying whether the information received from the radio frequency identification unit contains the access code.

22. The apparatus of claim 21, where the means for storing comprises a memory; the means for detecting comprises a radio frequency identification communications module; and the means for verifying, and licensing comprises a processor coupled to the radio frequency identification communications module.

* * * * *